(12) United States Patent  (10) Patent No.: US 7,577,183 B2
Nakayama                   (45) Date of Patent:    Aug. 18, 2009

(54) TRANSMISSION APPARATUS AND PEAK REDUCTION METHOD

(75) Inventor: Masahiko Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 11/189,699

(22) Filed: Jul. 27, 2005

(65) Prior Publication Data

US 2006/0023773 A1  Feb. 2, 2006

(30) Foreign Application Priority Data

Jul. 28, 2004 (JP) ............................... 2004-220593

(51) Int. Cl.
*H04B 1/00* (2006.01)

(52) U.S. Cl. .................. 375/146; 341/132; 348/356; 367/29; 374/127; 381/94.8

(58) Field of Classification Search ................ 375/146; 370/208, 335; 360/46; 455/115.1, 522
See application file for complete search history.

(56) References Cited

U.S. PATENT DOCUMENTS

| | | | |
|---|---|---|---|
| 5,321,559 A * | 6/1994 | Nguyen et al. ............... 360/46 |
| 5,751,705 A | 5/1998 | Sato |
| 6,301,221 B1 | 10/2001 | Paterson |
| 6,885,850 B2 | 4/2005 | Kobayashi et al. |

2002/0065095 A1  5/2002  Kobayashi et al.

FOREIGN PATENT DOCUMENTS

| | | | |
|---|---|---|---|
| EP | 1 011 207 A2 | 6/2000 |
| EP | 1011207 A2 | 6/2000 |
| JP | 09-018451 | 1/1997 |
| JP | 10-271072 | 10/1998 |
| JP | 1998-271072 | * 10/1998 |
| JP | 20382083 | 10/1998 |
| JP | 2000-183851 | 6/2000 |
| JP | 2002-164799 | 6/2002 |
| JP | 2002-171225 | 6/2002 |
| JP | 2003-124824 | * 4/2003 |

* cited by examiner

*Primary Examiner*—David C Payne
*Assistant Examiner*—Adolf Dsouza
(74) *Attorney, Agent, or Firm*—Foley & Lardner LLP

(57) ABSTRACT

There is a problem that a delay is caused in signal processing by exercising control so as to cause amplitude peaks in a transmission signal to fall in a prescribed range. A transmission apparatus for conducting wireless communication makes a decision whether a specific pattern which causes a peak exceeding a predetermined amplitude range to be generated in frequency characteristics of a transmission signal is included in a transmission code sequence for forming the transmission signal. And the transmission apparatus selects filter coefficients which prescribe a band limiting factor for the frequency characteristics of the transmission signal, on the basis of a result of the decision, and conducts filtering on the transmission code sequence by using the selected filter coefficients.

13 Claims, 9 Drawing Sheets

FIG.4

| COEFFICIENT | NUMERICAL VALUE A | NUMERICAL VALUE B |
|---|---|---|
| $a_1$ | -1 | THE SAME AS LEFT |
| $a_2$ | 1 | THE SAME AS LEFT |
| $a_3$ | 0 | THE SAME AS LEFT |
| $a_4$ | 0 | THE SAME AS LEFT |
| $a_5$ | 13 | THE SAME AS LEFT |
| $a_6$ | 27 | THE SAME AS LEFT |
| $a_7$ | 24 | THE SAME AS LEFT |
| $a_8$ | -1 | THE SAME AS LEFT |
| $a_9$ | -36 | THE SAME AS LEFT |
| $a_{10}$ | -57 | THE SAME AS LEFT |
| $a_{11}$ | -42 | THE SAME AS LEFT |
| $a_{12}$ | 22 | THE SAME AS LEFT |
| $a_{13}$ | 121 | THE SAME AS LEFT |
| $a_{14}$ | 222 | THE SAME AS LEFT |
| $a_{15}$ | 286 | THE SAME AS LEFT |
| $a_{16}$ | 286 | THE SAME AS LEFT |
| $a_{17}$ | 222 | 195 |
| $a_{18}$ | 121 | 95 |
| $a_{19}$ | 22 | THE SAME AS LEFT |
| $a_{20}$ | -42 | THE SAME AS LEFT |
| $a_{21}$ | -57 | THE SAME AS LEFT |
| $a_{22}$ | -36 | THE SAME AS LEFT |
| $a_{23}$ | -1 | THE SAME AS LEFT |
| $a_{24}$ | 24 | THE SAME AS LEFT |
| $a_{25}$ | 27 | THE SAME AS LEFT |
| $a_{26}$ | 13 | THE SAME AS LEFT |
| $a_{27}$ | 0 | THE SAME AS LEFT |
| $a_{28}$ | 0 | THE SAME AS LEFT |
| $a_{29}$ | 1 | THE SAME AS LEFT |
| $a_{30}$ | -1 | THE SAME AS LEFT |

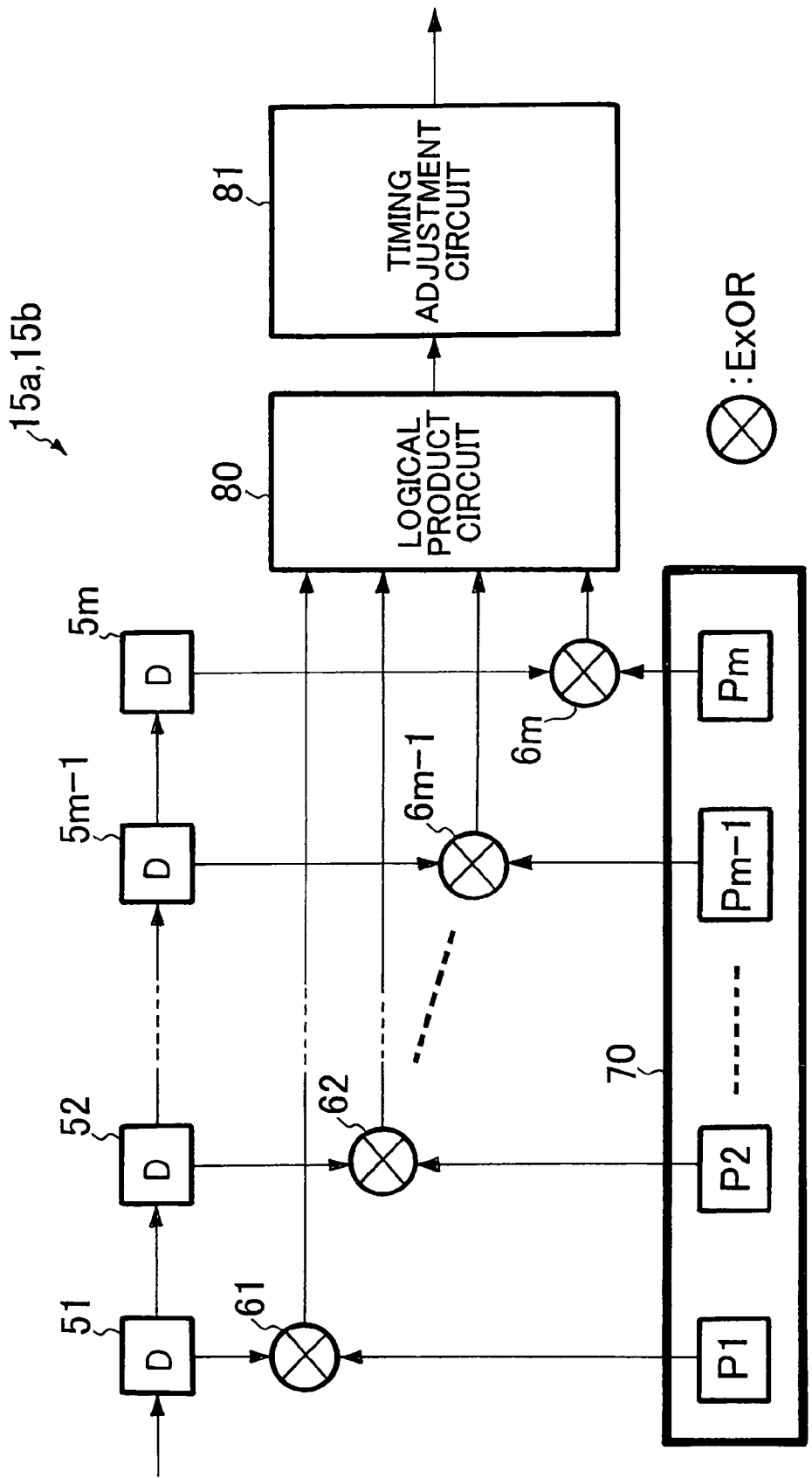

TRANSMISSION APPARATUS AND PEAK REDUCTION METHOD

BACKGROUND OF THE INVENTION

1. Field of the Invention

The present invention relates to a transmission apparatus and a peak reduction method. In particular, the present invention relates to a transmission apparatus for CDMA (Code Division Multiple Access) and a method for reducing the amplitude peak in its transmission signal.

2. Description of the Related Art

FIG. 8 is a block diagram showing an example of a configuration of a conventionally known transmission apparatus for CDMA terminal. In FIG. 8, data input to a transmission apparatus 100 are transmission data D1 to D6 and control data C0 to C2. The number of actually used transmission data and the number of control data might be decreased according to the subject apparatus. Spreaders 100a, 100b, 100c, 100d, 100e, 100f, 100g, 100h and 100i respectively spread the input transmission data D1, D3 and D5, control data C1, transmission data D2, D4 and D6, and control data C2 and C0 in accordance with a spreading factor specified by an upper layer which is not illustrated. The transmission data D1, D3 and d5 and the control data C1 are assigned to the Ich (In-phase channel), whereas the transmission data D2, D4 and D6 and the control data C0 and C2 are assigned to Qch (Quad-phase channel).

An adder 101a is an adder for conducting addition for Ich. The adder 101a adds up signals output from spreaders 100a, 100b, 100c and 100d. An adder 101b is an adder for conducting addition for Qch. The adder 101b adds up signals output from spreaders 100e, 100f, 100g, 100h and 100i.

A scrambling circuit 103 generates a scrambling code for conducting spreading modulation. A spreading modulation circuit 102 is supplied with a scrambling code which is an output of the scrambling circuit 103, and the spreading modulation circuit 102 conducts spreading modulation on data respectively input from the adder 101a and the adder 101b.

Band limiting filters 104a and 104b are filters for conducting band limiting on signals respectively of the Ich and Qch subjected to spreading modulation and output from the spreading modulation circuit 102. In order to raise the frequency utilization efficiency in an analog baseband signal when generating a transmission signal, band limiting filters are needed, therefore, the band limiting filters 104a and 104b include LPFs (Low Pass Filters) for conducting spectral shaping on the transmission signal. In terminal stations, for example, root raised cosine filters having a roll off factor of 0.22 are used as the LPFs.

DA converters 106a and 106b are digital-analog converters for the Ich and Qch, respectively. The DA converters 106a and 106b convert signals output from the band limiting filters 104a and 104b to analog signals, respectively. A modulation circuit 107 is a circuit for conducting analog modulation (QPSK: Quadrature Phase Shift Keying) on the Ich signal and Qch signal converted to analog signals by the DA converters 106a and 106b. An RF circuit 108 has a function of converting the analog signal modulated by the modulation circuit 107 to a carrier frequency and a function of amplifying a transmission signal. An antenna 109 has a function of radiating the transmission signal output from the RF circuit 108 as an electromagnetic wave.

As for amplifiers in the modulation circuit 107 and the RF circuit 108 used in the transmission apparatus 100 having such a configuration, it is necessary to use A-class amplifiers having fine linearity and wide dynamic characteristics in order to amplify an input waveform without distortion. If multiplexing (multi-coding) of signals advances, a large peak occurs in amplitude and the PAR (Peak-to-Average power ratio) representing the ratio of the peak to the average power becomes large. Therefore, it is conceivable to conduct clipping on the amplitude in order to improve the efficiency of power conversion. By doing so, however, distortion occurs in the spectrum, resulting in influence upon adjacent channels.

By the way, in the field of the mobile communication system represented by cellular phone, drawing up and proposal of standards are being performed by 3GPP (3rd Generation Partnership Project). Among them, specifications of a UE (User Equipment) which is a cellular phone or a terminal station, such as provisions concerning leak power of adjacent channels, are defined. When forming a transmitter in a terminal station on the basis of specifications of 3GPP, the design should satisfy the provisions.

In the standards of 3GPP, multiplexing of transmission codes at a terminal station is allowed, however, if the multiplex number of codes increases, a large peak occurs in the signal amplitude in some combination of the transmission data sequence. It is known that the transmission data sequence that generates the peak occurs with some probability and the peak pattern have a relation to the transmission data sequence.

On the other hand, when generating a transmission signal in wireless communication, a filter is used to conduct band limiting on an analog baseband signal. As the band limiting filter, an LPF (low pass filter) for conducting spectrum shaping on the transmission signal is used.

Typically, the band limiting filter of this kind is implemented as a digital circuit using an FIR (Finite Impulse Response) filter in order to obtain linear phase characteristics. The FIR filter outputs a waveform of an impulse response as shown in, for example, FIG. 9. Each of output waveforms of the DA converters 106a and 106b is a waveform formed by impulse response waveforms of individual transmission data overlapping along the time axis. An example thereof is shown in FIG. 10. In order to facilitate illustration, FIG. 10 shows not a waveform at the time of a multi-code, but a waveform at the time of a single code. If impulse response waveforms each having a waveform as shown in FIG. 9 overlap at a peak such as a point P, a point Q and a point R, a large peak which exceeds range of planned target R, such as a peak at a point S or a point T shown in FIG. 10, occurs sometimes. As already described, such a peak occurs with some probability.

When designing the transmission circuit of a terminal station in the mobile communication system, therefore, the number of bits in the DA converter 106a and 106b are determined with due regard to the characteristics of the filter so as to be capable of representing the entire waveform even if a peak exceeding the range of planned target occurs as represented by the point S and T in FIG. 10. For conducting the design with such a number of bits, however, a wide range is demanded for the frequency handled by the DA converters 106a and 106b. Furthermore, it also becomes important to take the CCDF (Complementary Cumulative Distribution Function) and the PAR into consideration in representing the amplitude of the transmission signal.

In other words, if the bit width of the DA converters 106a and 106b is determined so as to represent all amplitudes, the ratio of the peak to the average power becomes large and consequently it becomes necessary to take the influence of the quantization noise as well into consideration. In addition, there is also a problem that the circuit scale becomes large.

If there is a large peak in the transmission signal input to an amplifier in the succeeding modulation circuit 107 or RF circuit 108, a nonlinear region is used and consequently there is a fear that leak power to adjacent channels will be aggravated. For preventing this, it is demanded to use an A-class amplifier having a fine linearity and a wide range as described above. However, it leads to an increased cost of the apparatus.

In the circuit configuration of the transmitter in the conventional terminal station, the code multiplex number is comparatively small and consequently the circuit is designed so as to be able to represent all amplitudes without being much conscious of peaks. Recently, however, an increase of quantity of data transmitted to the base station on an uplink is expected. Furthermore, if multi-coding is adopted in the terminal station as well, it is considered that the amplitude peak in the transmission signal as described above will become larger. Therefore, means for suppressing the peaks are demanded.

Some conventional apparatuses suppressing the amplitude peaks in the transmission signal are known. For example, in a peak reduction apparatus described in JP-A-10-271072 (FIG. 1), a code sequence having a predetermined length and having a pattern which increases in amplitude when a transmission code sequence is limited in band by a transmission filter is set in a register. The peak reduction apparatus includes a comparison unit for comparing the code sequence with a transmission code sequence shifted into a shift register, and a code amplitude reduction unit supplied with a comparison coincidence signal from the comparison unit to reduce amplitude of at least one code disposed in the center of a predetermined length of the transmission code sequence. According to the peak reduction apparatus described in JP-A-10-271072, spread of the envelope of the signal limited in band by the transmission filter is reduced. Therefore, spread of the band caused by nonlinear distortion in a transmission amplifier unit can be suppressed.

In a peak factor reduction apparatus described in JP-A-2003-124824 (FIGS. 1 and 3), a correction signal which concentrates energy only immediately in the vicinity of a peak pulse is generated. Elimination of the peak pulse is conducted on the basis of the correction signal. As a result, the influence on the degradation of the signal quality can be held down to a slight value. This apparatus inputs an input signal to a reference filter and predicts what kind of a peak occurs when band limiting is conducted. Only a part for which an output of the reference filter has exceeded a preset value is extracted by an amplitude control unit to form a peak pulse. Subsequently, at a point in time in which the peak pulse becomes the maximum, an impulse signal having amplitude proportionate to the peak pulse is generated. The input signal is delayed by a delay unit and aligned in timing with the impulse signal. The impulse signal is subtracted in signal from an output of the delay unit by an adder, and a resultant signal is output. The output signal is finally limited in band by a band limiting filter. On the basis of the superposition theorem in the linear circuit, the peak amplitude generated by the input signal and the impulse response amplitude generated by the impulse signal coincide with each other in position and amplitude, and they are opposite in phase. Therefore, an amplitude component that has exceeded the peak is suppressed, and the peak factor can be held down to a preset value.

In JP-A-2002-164799 (FIG. 2), a transmission power control method for communication apparatus capable of suppressing the occurrence of a peak factor at the time of user multiplexing is disclosed. In this method, transmission data before being input to a band limiting filter is branched, then one of the branched transmission data is passed through a peak detection filter having the same configuration as a band limiting filter to obtain a correction value for suppressing a power peak of the transmission data. The other of the branched transmission data is delayed by a time for obtaining the correction value, then corrected by the correction value, and then input to the band limiting filter. A maximum value of a power peak of transmission data passed through the peak detection filter is obtained every sampling time. The maximum value is compared with a peak suppression threshold to obtain a correction value.

By the way, it is desirable that an increase of signal delay caused by a circuit added to hold down the amplitude peak of the transmission signal is as small as possible. In the conventionally known techniques, however, a considerably long delay is caused by the added circuit.

In other words, in the peak reduction apparatus described in JP-A-10-271072, a delay time for shifting the transmission code sequence in the shift register is added before holding down the amplitude peak of the transmission signal in the code amplitude reduction unit.

In the peak factor reduction apparatus described in JP-A-2003-124824, the input signal is delayed by the delay unit to align the input signal in timing with the impulse signal, resulting in an increased delay time.

In the transmission power control method described in JP-A-2002-164799, the delay is increased by the time for obtaining the correction value.

SUMMARY OF THE INVENTION

An object of the present invention is to avoid causing an excessive peak in frequency characteristics while conducting signal processing for generating a transmission signal quickly.

A transmission apparatus according to the present invention includes a pattern detection unit for making a decision whether a specific pattern which causes a peak exceeding a predetermined amplitude range to be generated in frequency characteristics of a transmission signal is included in a transmission code sequence for forming the transmission signal, and a filter unit for selecting filter coefficients which prescribe a band limiting factor for the frequency characteristics of the transmission signal, on the basis of a result of the decision, and conducting filtering on the transmission code sequence by using the selected filter coefficients.

A peak reduction method according to the present invention is a method in which a transmission apparatus for conducting wireless communication executes the steps of making a decision whether a specific pattern which causes a peak exceeding a predetermined amplitude range to be generated in frequency characteristics of a transmission signal is included in a transmission code sequence for forming the transmission signal, and selecting filter coefficients which prescribe a band limiting factor for the frequency characteristics of the transmission signal, on the basis of a result of the decision, and conducting filtering on the transmission code sequence by using the selected filter coefficients.

According to the present invention, as regards patterns of a transmission code sequence, a specific pattern which causes an excessive peak in frequency characteristics of the transmission signal is previously grasped. When the specific pattern is detected in the actually processed transmission code sequence, operation is conducted to execute switching to filter coefficients which can reduce the excessive peak. As a result, the frequency characteristics of the transmission signal can be adjusted suitably without causing a remarkable delay in the transmission signal generation processing.

BRIEF DESCRIPTION OF THE DRAWINGS

FIG. 4 is a diagram showing examples of coefficients in the coefficient unit;

FIG. 5 is a block diagram showing a configuration of a pattern comparison circuit according to an embodiment of the present invention;

DESCRIPTION OF THE PREFERRED EMBODIMENTS

A transmission apparatus according to an embodiment of the present invention includes a pattern comparison circuit for detecting a specific pattern included in a transmission code sequence and outputting a result of detection, and a band limiting filter for conducting predetermined band limiting on the transmission code sequence, outputting a resultant code sequence as a transmission signal, and changing filter coefficients used for the band limiting on the basis of the detection result of the specific pattern.

The pattern comparison circuit records a specific pattern that can become an excessive peak and that is included in the transmission code sequence, in a memory, and makes a decision whether there is the specific pattern by comparing the specific pattern with a transmission code sequence that becomes a subject of processing at the current point in time. The band limiting filter adjusts a band limiting factor of filtering by selecting filter coefficients on the basis of a result of the decision made by the pattern comparison circuit. According to the present embodiment, the pattern comparison of the code sequence is conducted concurrently with and in parallel to the original operation of the band limiting filter. Therefore, the processing delay caused by the addition of the pattern comparison circuit can be made short to the utmost.

First Embodiment

Figure 1:
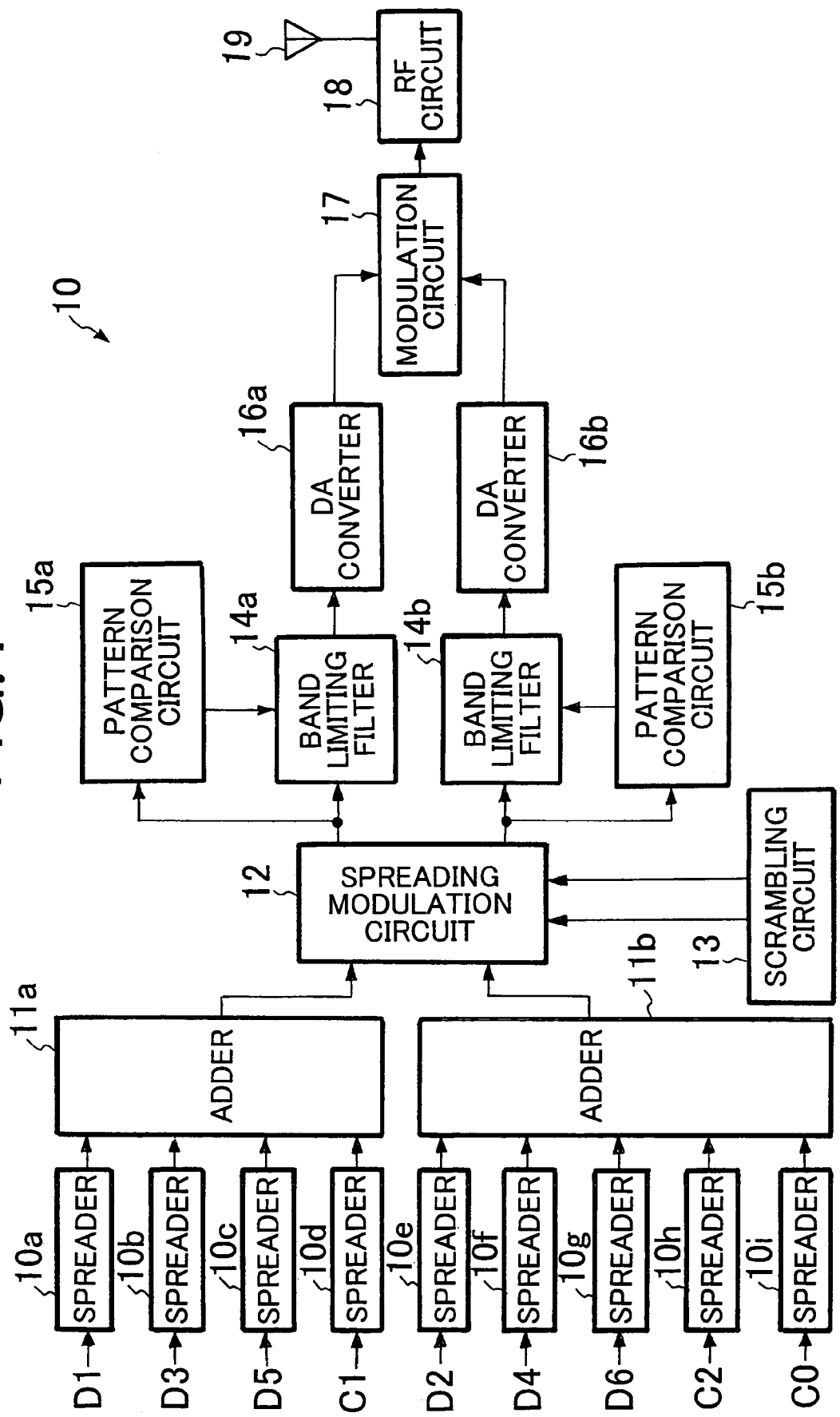
FIG. 1 is a block diagram showing a configuration of a transmission apparatus according to an embodiment of the present invention.
Figure 8:
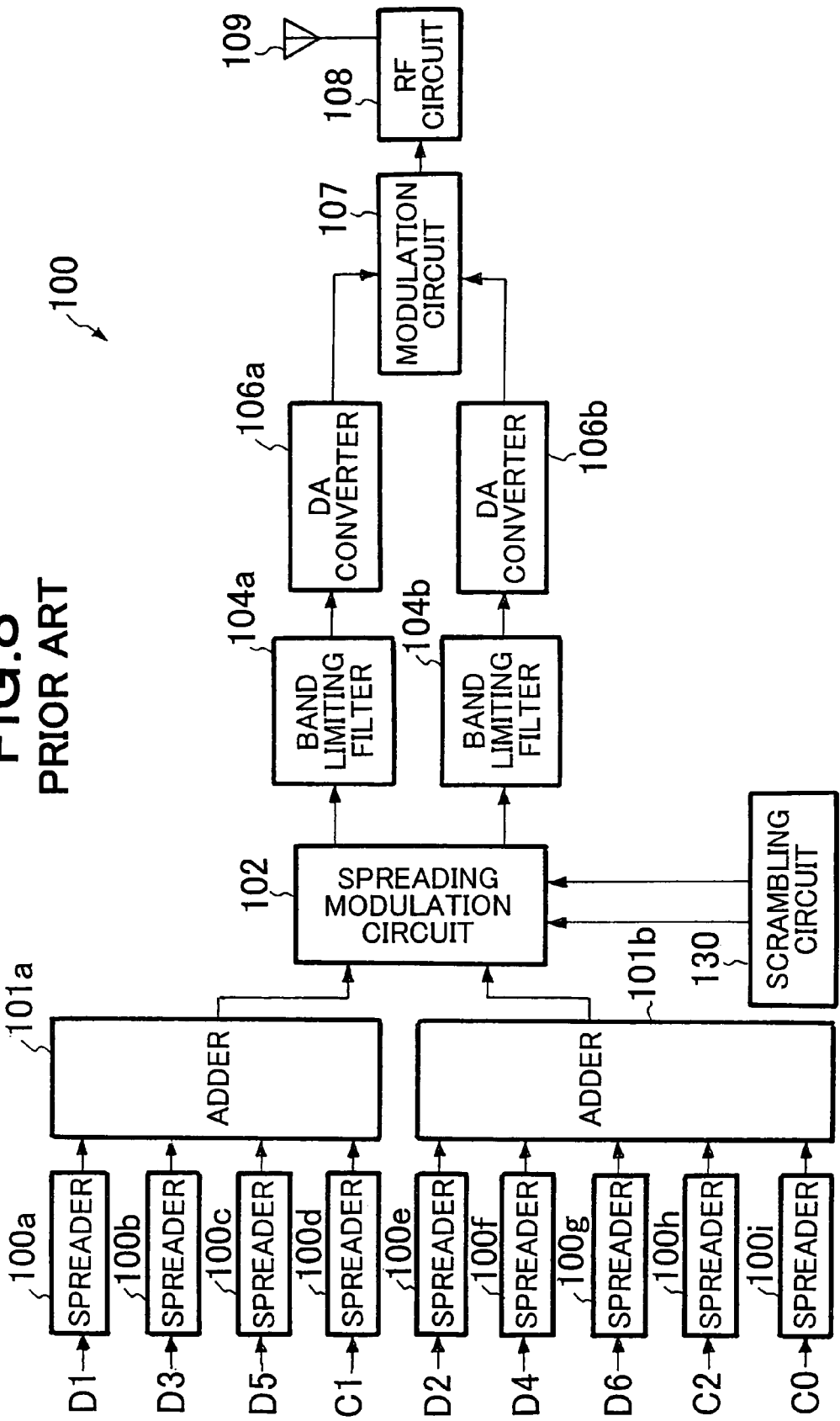
FIG. 8 is a block diagram showing an example of a configuration of a conventional transmission apparatus for CDMA terminal.
Figure 9:
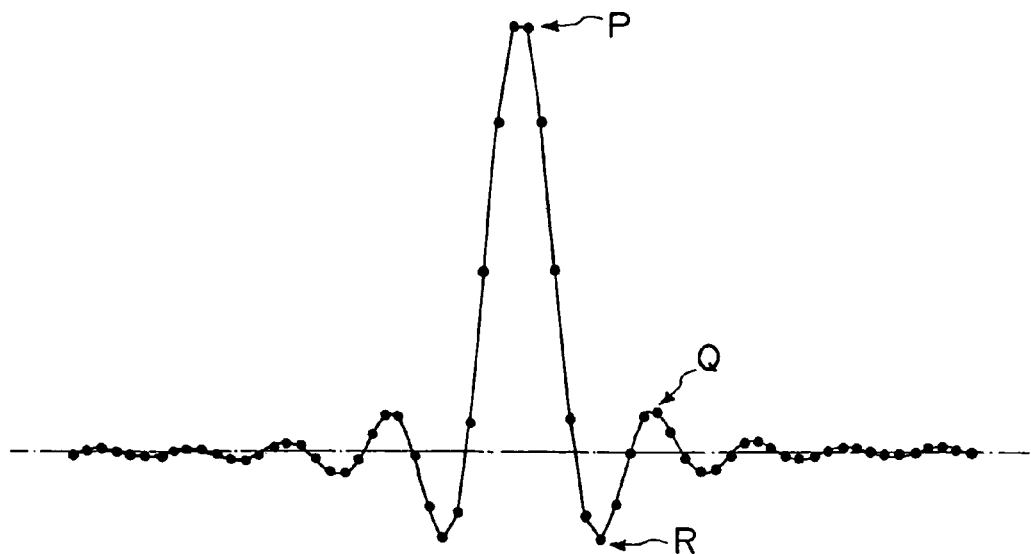
FIG. 9 is a diagram showing a waveform of an impulse response.

FIG. 1 is a block diagram showing a configuration of a transmission apparatus according to an embodiment of the present invention. As for spreaders 10a, 10b, 10c, 10d, 10e, 10f, 10g, 10h and 10i, adders 11a and 11b, a spreading modulation circuit 12, a scrambling circuit 13, DA converters 16a and 16b, a modulation circuit 17, an RF circuit 18 and an antenna 19 shown in FIG. 1, components similar to the spreaders 100a, 100b, 100c, 100d, 100e, 100f, 100g, 100h and 100i, the adders 101a and 101b, the spreading modulation circuit 102, the scrambling circuit 103, the DA converters 106a and 106b, the modulation circuit 107, the RF circuit 108 and the antenna 109 included in the conventional transmission apparatus as shown in FIG. 8 can be used, respectively. Description of those components will be omitted. Hereafter, the band limiting filters 14a and 14b and the pattern comparison circuits 15a and 15b according to the present embodiment will be mainly described.

The band limiting filters 14a and 14b are filters for conducting band limiting on the spreading modulation signals for Ich and Qch subjected to the spreading modulation in the spreading modulation circuit 12. When the corresponding pattern comparison circuits 15a and 15b have detected the specific pattern, the band limiting filters 14a and 14b change the frequency characteristics by altering their own filter coefficients.

Each of the pattern comparison circuits 15a and 15b previously store a specific pattern of transmission data that causes an excessive peak in the transmission signal. Transmission data output from the spreading modulation circuit 12 are successively input to the pattern comparison circuits 15a and 15b. Each of the pattern comparison circuits 15a and 15b makes a decision whether the transmission data coincides with the specific pattern.

Figure 2:
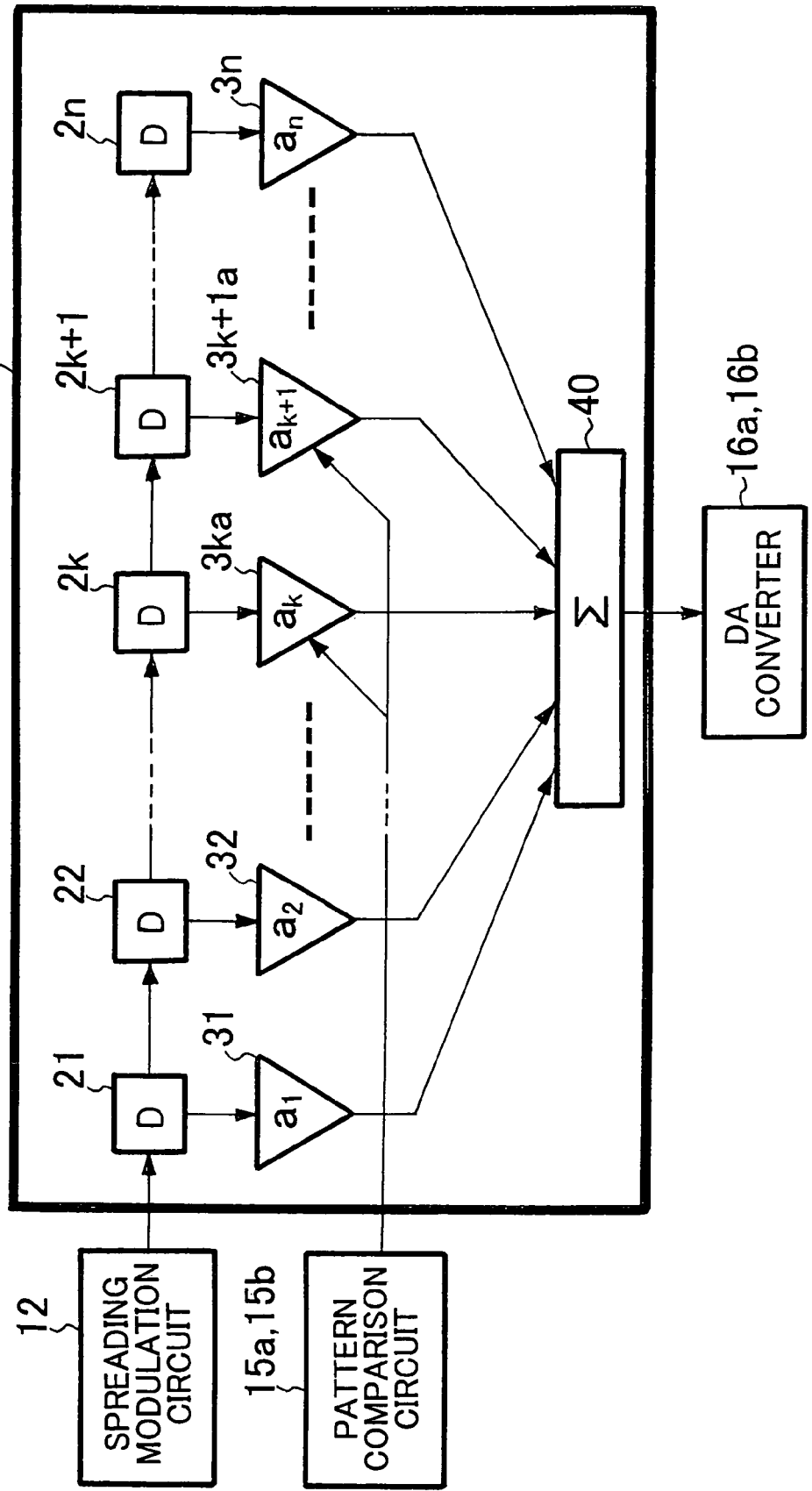
FIG. 2 is a block diagram showing a configuration of a band limiting filter according to a first embodiment of the present invention.

Details of the band limiting filters 14a and 14b will now be described. FIG. 2 is a block diagram showing a configuration of each of the band limiting filters 14a and 14b according to a first embodiment. In FIG. 2, latch circuits 21, 22, ..., 2k, 2k+1, ..., 2n are circuits for successively latching the transmission data output from the spreading modulation circuit 12. The latch circuits may include shift registers. Coefficient units 31, 32, ..., 3ka, 3k+1a, ..., 3n include multipliers, respectively. The coefficient units 31, 32, ..., 3ka, 3k+1a, ..., 3n multiply outputs of the coefficient units 31, 32, ..., 3ka, 3k+1a, ..., 3n by preset coefficients, respectively. The coefficients retained by the coefficient units 31 to 3n correspond to coefficients of the FIR filter. In the illustrated coefficient units 3ka and 3k+1a, a plurality of coefficients are set. They are switched according to an output of the pattern comparison circuit 15a. An adder 40 adds up signals output from the coefficient units 31, 32, ..., 3ka, 3k+1a, ..., 3n, and supplies a result of the addition to the DA converter 16a or 16b as an output signal of the band limiting filter 14a or 14b.

Figure 3:
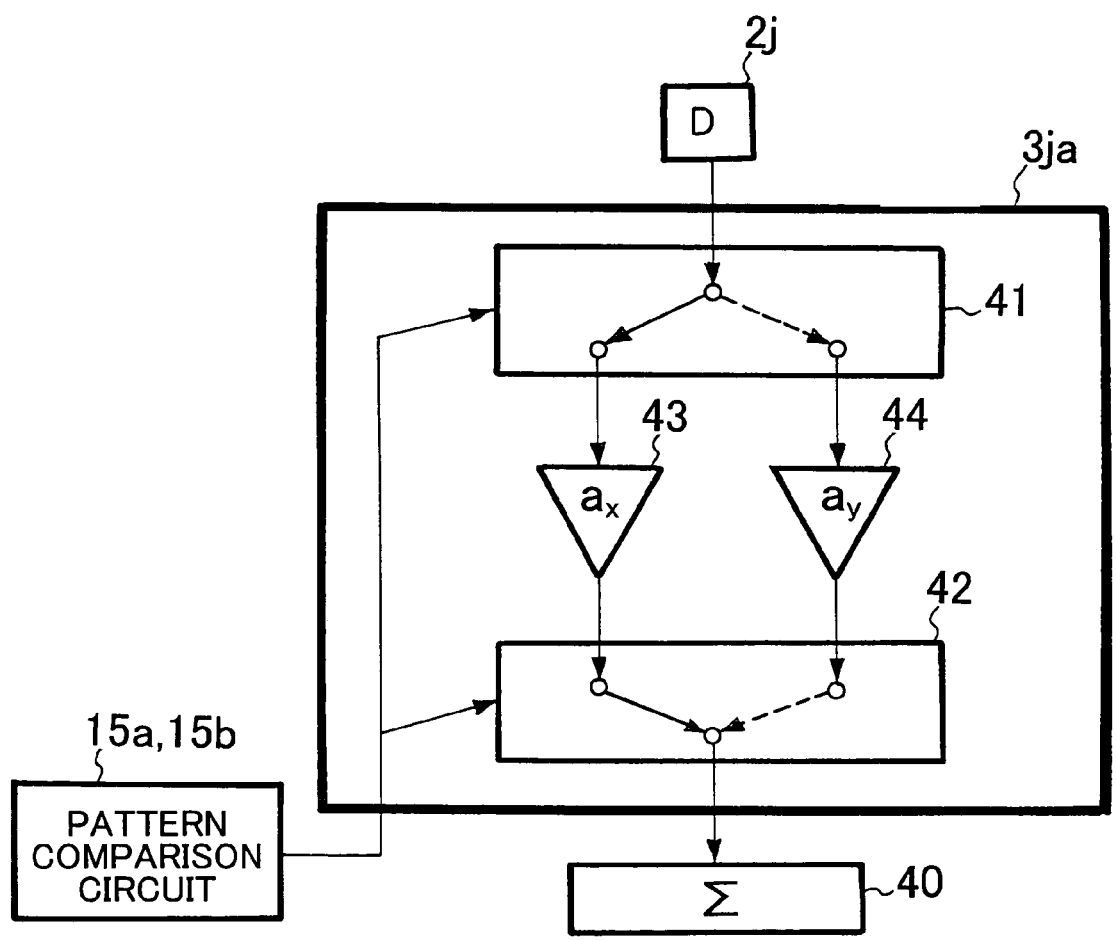
FIG. 3 is a block diagram showing a configuration of a coefficient unit having two coefficients according to an embodiment of the present invention.

The coefficient units 3ka and 3k+1a each having a plurality of coefficients will now be described. FIG. 3 is a block diagram showing a configuration of a coefficient unit having two coefficients. An illustrated coefficient unit 3ja corresponds to each of the coefficient units 3ka and 3k+1a shown in FIG. 2. The coefficient unit 3ja includes switches 41 and 42 and coefficient units 43 and 44. The switches 41 and 42 function to select the coefficient unit 43 ($a_x$) when the specific pattern is not detected by the corresponding pattern comparison circuits 15a and 15b, and select the other coefficient unit 44 ($a_y$) when the specific pattern is detected. When selected, each of the coefficient units 43 and 44 multiplies a signal output from a latch circuit 2j by its coefficient ($a_x$ or $a_y$), and outputs a result of the multiplication toward the adder 40.

Each of the band limiting filters 14a and 14b as heretofore described forms an FIR filter having frequency characteristics determined by the coefficients in the coefficient units 31, 32, ..., 3ka, 3k+1a, ..., 3n, and changes frequency characteristics according to whether the pattern comparison circuit 15a or 15b has detected the specific pattern. When the pattern comparison circuit 15a or 15b has detected the specific pattern, the corresponding band limiting filter 14a or 14b changes the frequency characteristics so as to decrease the peak value of its output signal.

An example of coefficients set in the coefficient units 31, 32, . . . , 3ka, 3k+1a, . . . , 3n is shown in FIG. 4. A "Numerical value A" and a "numerical value B" are set in each of illustrated coefficients a1 to a30. In "$a_{17}$" and "$a_{18}$" among the illustrated coefficients, different values are set as the "numerical value A" and the "numerical value B." These coefficients "$a_{17}$" and "$a_{18}$" correspond to the coefficient units 3ka and 3k+1a which switch a plurality of coefficients according to the detection result of the pattern comparison circuits 15a and 15b. The coefficient units 31 to 3n having coefficients set as shown in FIG. 4 use the "numerical value A" when the specific pattern is not detected by the corresponding pattern comparison circuit 15a or 15b, and use the "numerical value B" when the specific pattern is detected by the corresponding pattern comparison circuit 15a or 15b. In this way, each of the band limiting filter 14a and 14b changes frequency characteristics by changing the values of the coefficients "$a_{17}$" and "$a_{18}$" on the basis of the detection result of the specific pattern.

The pattern comparison circuits 15a and 15b will now be described. FIG. 5 is a block diagram showing a configuration of a pattern comparison circuit according to an embodiment of the present invention. In FIG. 5, each of the pattern comparison circuits 15a and 15b includes latch circuits 51, 52, . . . , 5m−1, 5m, exclusive OR circuits 61, 62, . . . , 6m−1, 6m, a storage circuit 70, a logical product circuit 80, and a timing adjustment circuit 81. The latch circuits 51, 52, . . . , 5m−1, 5m are circuits for successively latching transmission data output from the spreading modulation circuit 12. The latch circuits 51, 52, . . . , 5m−1, 5m may be formed of shift registers. The storage circuit 70 is a circuit for storing the specific pattern. The storage circuit 70 stores data P1, P2, . . . , Pm−1, Pm that constitute the specific pattern. The storage circuit 70 includes ROMs or RAMs. A sequence that generates a predetermined peak is previously calculated by using a theoretical value or simulation, and it is stored as the illustrated data P1 to Pm. In FIG. 5, an example in which one specific pattern is stored in the storage circuit 70 is shown. However, a plurality of specific patterns may also be stored. If a plurality of specific patterns are stored, each of the pattern comparison circuits 15a and 15b compares each of the specific patterns with the transmission data.

The exclusive OR circuits 61, 62, . . . , 6m−1, 6m perform exclusive OR-ing function on the output data of the latch circuits 51, 52, . . . , 5m−1, 5m and the data P1, P2, . . . , Pm−1, Pm of the specific pattern, respectively. In other words, the exclusive OR circuits 61, 62, . . . , 6m−1, 6m makes a decision whether they coincide with each other. The logical product circuit 80 obtains a logical product of outputs of the exclusive OR circuits 61 to 6m. On the basis of a result of the logical product, it is found whether the output data of the latch circuits 51 to 5m coincide with the data P1 to Pm of the specific pattern, i.e., whether the specific pattern is detected. The timing adjustment circuit 81 provides an output signal of the logical product circuit 80 with suitable timing by using delay processing, and outputs the output signal to the band limiting filter (14a or 14b). As for the latch circuits 51, 52, . . . , 5m−1, 5m shown in FIG. 5, a part of the latch circuits 21, 22, . . . , 2k, 2k+1, . . . , 2n in the band limiting filter 14a or 14b shown in FIG. 2 can also be used.

As heretofore described, each of the pattern comparison circuits 15a and 15b detects whether the transmission data output from the spreading modulation circuit 12 coincides with the specific pattern. Upon receiving the result of the detection, the band limiting filter 14a or 14b changes the frequency characteristics so as to reduce the predetermined peak value in the transmission signal when the specific pattern is included in the transmission signal.

Figure 6:
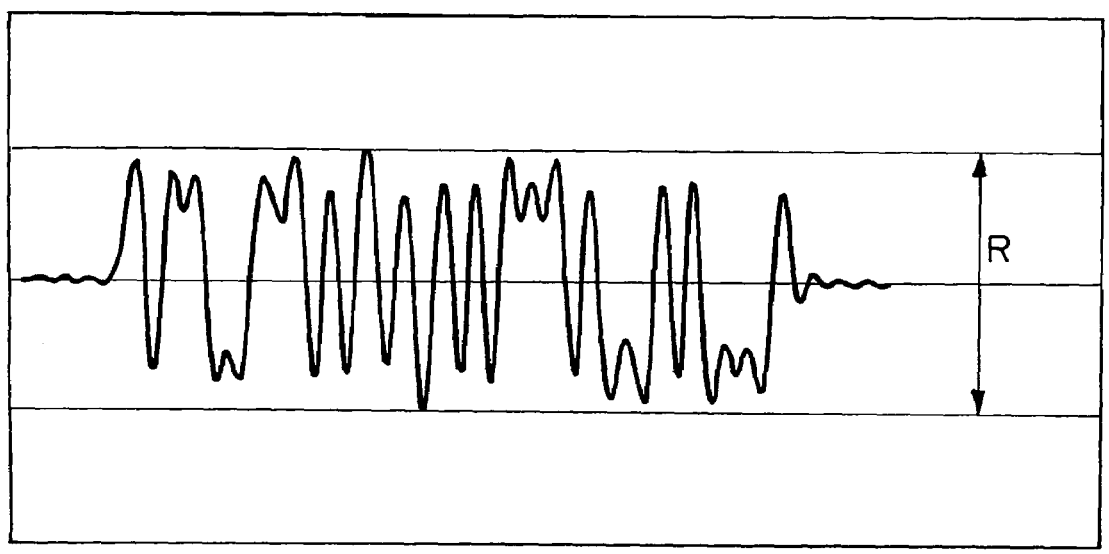
FIG. 6 is a diagram showing an example of an output waveform of a DA converter according to an embodiment of the present invention.
Figure 10:
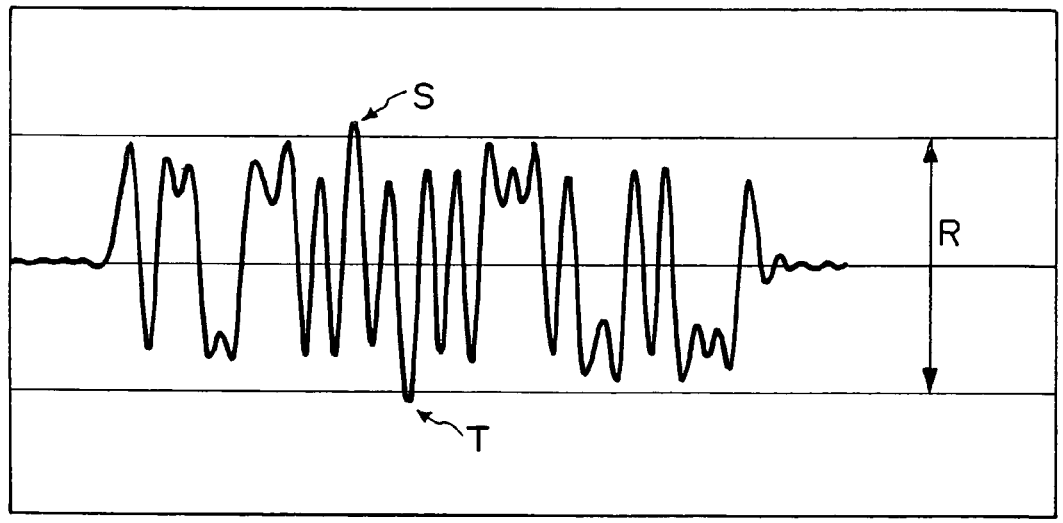
FIG. 10 is a diagram showing an example of an output waveform of a conventional DA converter.

An example of a waveform output from the band limiting filter 14a or 14b will now be described. FIG. 6 is a diagram showing an example of an output waveform of the DA converter 16a or 16b. By the way, FIG. 6 shows a waveform example of not a multi-code output but a single code output for the purpose of description. It is appreciated that in the waveform shown in FIG. 6 peaks such as the points S and T in the conventional output waveform shown in FIG. 10 are reduced and the waveform falls in a desired range R (index) in the illustrated period of time.

Second Embodiment

Figure 7:
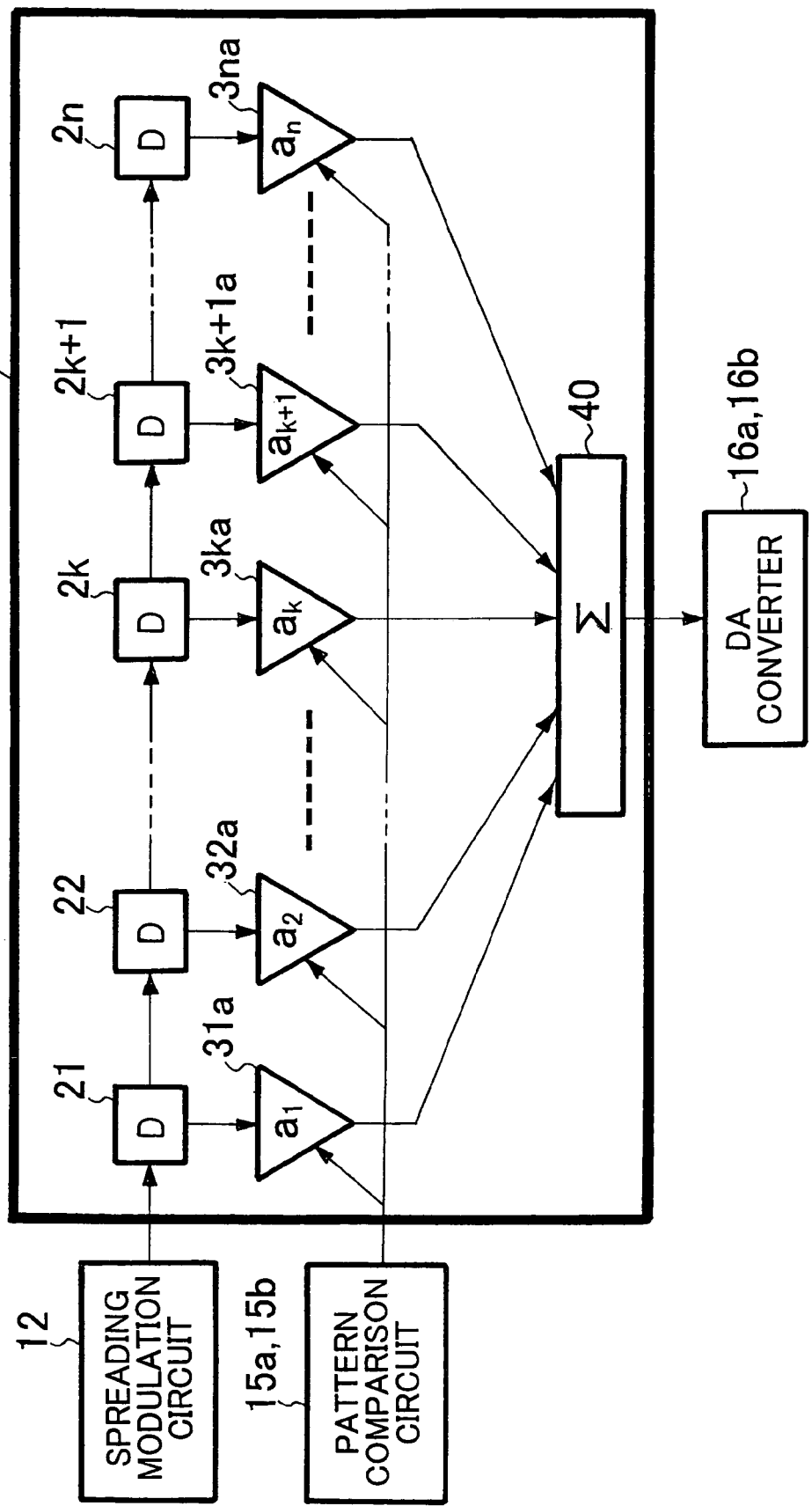
FIG. 7 is a block diagram showing a configuration of a band limiting filter according to a second embodiment of the present invention.

FIG. 7 is a block diagram showing a configuration of each of the band limiting filters 14a and 14b according to a second embodiment of the present invention. Each of the band limiting filters 14a and 14b shown in FIG. 7 has nearly the same configuration as that of the band limiting filter shown in FIG. 2. However, each of the band limiting filter 14a and 14b differs in that each of coefficient units 31a, 32a, . . . , 3ka, 3k+1a, . . . , 3na has two coefficients and the two coefficients are switched according to the output of the pattern comparison circuit 15a or 15b. Thus, in the band limiting filters 14a and 14b of the present embodiment, all of the coefficient units 31a to 3na are provided with coefficient choices. Therefore, the degree of freedom at the time when adjusting the amplitude of the output signal can be increased.

By the way, the transmission apparatus of the embodiments can be included in portable communication terminals such as cellular phones.

What is claimed is:

1. A transmission apparatus comprising:
   a pattern detection unit for making a decision whether a specific pattern which causes a peak exceeding a predetermined amplitude range to be generated in frequency characteristics of a transmission signal is included in a transmission code sequence for forming the transmission signal by comparing the specific pattern with the transmission code sequence; and
   a filter unit for selecting filter coefficients which prescribe a band limiting factor for the frequency characteristics of the transmission signal and which correspond to the decision of the pattern detection unit by using information on relation between expected decisions of the pattern detection unit and filter coefficients for reducing the peaks, and for conducting band limiting on the transmission code sequence by using the selected filter coefficients,
   wherein the comparison of the pattern detection unit is conducted in parallel to the band limiting of the filter unit.

2. The transmission apparatus according to claim 1, wherein
   the filter unit has filter coefficients of two systems associated with whether there is the specific pattern, and
   the filter unit switches the filter coefficients of the two systems according to the result of the decision.

3. The transmission apparatus according to claim 2, wherein the filter unit uses mutually different values as the filter coefficients of the two systems, for a part of the transmission code sequence.

4. The transmission apparatus according to claim 2, wherein the filter unit uses mutually different values as the filter coefficients of the two systems.

5. The transmission apparatus according to claim 1, wherein the filter unit comprises an FIR (Finite Impulse Response) filter.

6. The transmission apparatus according to claim 1, wherein the pattern detection unit comprises:
- a storage circuit for storing the specific pattern;
- a register circuit for acquiring the transmission code sequence;
- an operation circuit for making a decision whether the transmission code sequence acquired by the register circuit coincides with the specific pattern stored in the storage circuit.

7. The transmission apparatus according to claim 1, wherein the transmission code sequence is a code sequence obtained by conducting spreading modulation on transmission data.

8. A mobile communication terminal comprising the transmission apparatus according to claim 1.

9. The mobile communication terminal according to claim 8, wherein the pattern detection unit and the filter unit are used for signal processing of Ich (In-phase channel) and Qch (Quad-phase channel) in CDMA (Code Division Multiple Access).

10. A peak reduction method in which a transmission apparatus for conducting wireless communication executes the steps of:
- making a decision whether a specific pattern which causes a peak exceeding a predetermined amplitude range to be generated in frequency characteristics of a transmission signal is included in a transmission code sequence for forming the transmission signal by comparing the specific pattern with the transmission code sequence; and
- selecting filter coefficients which prescribe a band limiting factor for the frequency characteristics of the transmission signal and which correspond to the made decision by using information on relation between expected decisions about the specific pattern and filter coefficients for reducing the peak, and conducting band limiting on the transmission code sequence by using the selected filter coefficients,
- wherein the comparison of the specific pattern with the transmission code sequence is conducted in parallel to the band limiting on the transmission code sequence.

11. The peak reduction method according to claim 10, wherein at the step of conducting filtering on the transmission code sequence,
the transmission apparatus switches filter coefficients of the two systems associated with whether there is the specific pattern, on the basis of the result of the decision.

12. The peak reduction method according to claim 11, wherein the transmission apparatus uses mutually different values as the filter coefficients of the two systems, for a part of the transmission code sequence.

13. The peak reduction method according to claim 11, wherein the transmission apparatus uses mutually different values as the filter coefficients of the two systems, for the entire transmission code sequence.

* * * * *